United States Patent
Wei et al.

(10) Patent No.: US 9,428,643 B2
(45) Date of Patent: Aug. 30, 2016

(54) FLAME RETARDANT POLYESTER COMPOSITION

(71) Applicant: SABIC GLOBAL TECHNOLOGIES B.V., Bergen op Zoom (NL)

(72) Inventors: Zhenke Wei, Shanghai (CN); Ying Xi, Shanghai (CN); Hongtao Shi, Shanghai (CN); Yegang Lin, Shanghai (CN); Dake Shen, Shanghai (CN)

(73) Assignee: SABIC GLOBAL TECHNOLOGIES B.V. (NL)

( * ) Notice: Subject to any disclaimer, the term of this patent is extended or adjusted under 35 U.S.C. 154(b) by 0 days.

(21) Appl. No.: 14/425,088

(22) PCT Filed: Dec. 13, 2012

(86) PCT No.: PCT/CN2012/086559
§ 371 (c)(1),
(2) Date: Mar. 2, 2015

(87) PCT Pub. No.: WO2014/089806
PCT Pub. Date: Jun. 19, 2014

(65) Prior Publication Data
US 2015/0274963 A1    Oct. 1, 2015

(51) Int. Cl.
*C08K 3/22* (2006.01)
*C08K 3/34* (2006.01)
*C08L 67/02* (2006.01)
*C08L 69/00* (2006.01)

(52) U.S. Cl.
CPC .............. *C08L 67/02* (2013.01); *C08K 3/2279* (2013.01); *C08K 3/34* (2013.01); *C08L 69/00* (2013.01); *C08K 2003/2206* (2013.01); *C08L 2201/02* (2013.01); *C08L 2201/08* (2013.01); *C08L 2205/025* (2013.01); *C08L 2205/03* (2013.01); *C08L 2205/035* (2013.01); *C08L 2207/066* (2013.01)

(58) Field of Classification Search
CPC ....... C08K 3/22; C08K 3/2279; C08L 67/02; C08L 2201/02
See application file for complete search history.

(56) References Cited

U.S. PATENT DOCUMENTS 7,868,090 B2 * 1/2011 Juikar .................... C08F 14/18
525/121

FOREIGN PATENT DOCUMENTS

| CN | 101186688 A | 5/2008 |
| CN | 102643489 A | 8/2012 |
| GB | 1451335 | 9/1976 |
| WO | 03020826 A1 | 3/2003 |
| WO | 2014089806 A1 | 6/2014 |

OTHER PUBLICATIONS

International Search Report and Written Opinion dated Sep. 26, 2013; International Application No. PCT/CN2012/086559; International Filing Date Dec. 13, 2012 (13 pages).
International Preliminary Report on Patentability May 29, 2015; International Application No. PCT/CN2012/086559; International Filing Date Dec. 13, 2012 (27 pages).

* cited by examiner

*Primary Examiner* — Vickey Nerangis
(74) *Attorney, Agent, or Firm* — Cantor Colburn LLP

(57) ABSTRACT

Disclosed herein is a method of reducing the amount of antimony flame retardant compound in a flame retardant composition which comprises using calcium oxide or a combination of talc and calcium oxide as a filler in the composition, wherein the composition comprises specific amounts of a polyester, a brominated flame retardant compound, an antimony flame retardant compound, and a filler comprising calcium oxide or a combination of talc and calcium oxide. Also disclosed are compositions prepared by such a method and articles derived therefrom.

10 Claims, No Drawings

FLAME RETARDANT POLYESTER COMPOSITION

BACKGROUND OF THE INVENTION

Polyesters, particularly polybutylene terephthalate (PBT) and polyethylene terephthalate (PET), are widely used as components in various flame retardant plastics to cover electrical wires and electrical components. Many of the flame retardant polyester compositions currently available contain a brominated flame retardant compound as well as an antimony flame retardant compound which is frequently antimony trioxide ($Sb_2O_3$). However, such compositions have some drawbacks. For instance, using brominated components and $Sb_2O_3$ in the flame retardant compositions can reduce the comparative tracking index (CTI) of polyesters such as PBT, especially when brominated polycarbonate or tetrabromobisphenol-A carbonate oligomers are also present. CTI measures the electrical breakdown (tracking) of insulating materials. A reduction in CTI indicates lower insulating performance. In addition, because of their acidity, brominated components and $Sb_2O_3$ cause compositions to age at a faster rate than compositions that don't contain brominated components and antimony oxide. Finally, the use of $Sb_2O_3$ presents a significant health risk to consumers.

As a result, there is an ongoing need for alternative, less-costly flame retardant polyester compositions that contain minimized amounts of antimony flame retardant compound, but that maintain or surpass the performance attributes of currently available flame retardant polyester compositions.

SUMMARY OF THE INVENTION

These and other needs are met by the present invention which is directed to a method for reducing the amount of antimony flame retardant compound that is needed in a flame retardant composition, as well as compositions prepared according to the method. By using calcium oxide or a combination of calcium oxide and talc as a composition filler, the amount of antimony flame retardant compound that is used in the polyester compositions can be reduced by as much as 60 percent. The resulting compositions have comparable or improved performance characteristics and pose less of a health risk to consumers. The compositions also pose a significant cost savings, since calcium oxide and talc are much cheaper to use as additives than antimony oxide.

In one aspect, the invention provides a method of reducing the amount of antimony flame retardant compound in a flame retardant composition which comprises using calcium oxide or a combination of talc and calcium oxide as a filler in the composition, wherein the composition comprises:
(a) 30 to 80 percent by weight of a polyester;
(b) 3 to 30 percent by weight of a brominated flame retardant compound;
(c) 0.1 to 5 percent by weight of an antimony flame retardant compound;
(d) 0.01 to 5 percent by weight of a filler comprising calcium oxide or a combination of talc and calcium oxide; and wherein:
  (i) the composition meets or exceeds the requirements of UL94-V2;
  (ii) less antimony retardant compound is present in the composition comprising (a), (b), (c), and (d) as compared to a composition comprising component (a), (b), (c) and no (d);
  (iii) the comparative tracking index (CTI) is the same as or greater than the CTI for a corresponding composition comprising (a), (b), (c), and (d) as compared to a composition comprising component (a), (b), (c) and no (d);
  and wherein the weight percents are based on the total weight of the composition.

In this and other aspects of the invention as disclosed herein, the talc is not LHX999 from Shenzhen Lian He Xin Technology Co., Ltd. (China).

The invention also provides compositions prepared according to the method as well as articles derived therefrom.

The inventors were surprised to find that the compositions prepared by the method described and claimed herein did not exhibit reduced flame retardant performance. This discovery stands in contrast to the results of a recent paper entitled "Studies on the Preparation and Properties of Flame-retardant Reinforced PBT with High Comparative Tracking Index" (http://www.engpapers.com/107180.html, last visited Sep. 13, 2012). The paper reports that calcium oxide addition reduced flame retardant performance in formulations containing PBT, glass fiber, antimony oxide, and the chlorinated flame retardant Dechlorane Plus (DRCP; 1,2,3,4,7,8,9,10,13,13,14,14-dodecachloro-1,4,4a,5,6,6a,7,10,10a,11,12,12a-dodecahydro-1,4,7,10-dimethanodibenzo[a,e]cyclooctene; CAS 13560-89-9) as compared to calcium oxide-free formulations.

DETAILED DESCRIPTION OF THE INVENTION

If a term in the present application contradicts or conflicts with a term in a reference, the term in the present application takes precedence over the conflicting term from the reference. All ranges disclosed herein are inclusive of the endpoints, and the endpoints are independently combinable with each other. The use of the terms "a" and "an" and "the" and similar referents in the context of describing the invention (especially in the context of claims) are to be construed to cover both the singular and the plural, unless otherwise indicated herein or clearly contradicted by context. It should further be noted that the terms "first," "second," and the like herein do not denote any order, quantity, or importance, but rather are used to distinguish one element from another. The modifier "about" used in connection with a quantity is inclusive of the stated value and has the meaning dictated by the context (that is, it includes the degree of error associated with measurement of the particular quantity). As used herein all weight percents are based on the total weight of the composition.

Polyester

The composition comprises a polyester of formula 1:

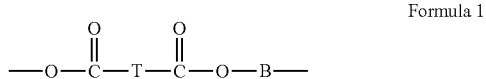

Formula 1 wherein:
B is a divalent radical derived from a dihydroxy compound, and may be, for example, a $C_{2-10}$ alkylene radical, a $C_{6-20}$ alicyclic radical, a $C_{6-20}$ aromatic radical or a polyoxyalkylene radical in which the alkylene groups contain 2 to 6 carbon atoms, specifically 2, 3, or 4 carbon atoms; and T is a divalent radical derived from a dicarboxylic acid, and may be, for example, a $C_{2-10}$ alkylene radical, a $C_{6-20}$ alicyclic radical, a $C_{6-20}$ alkyl aromatic radical, or a $C_{6-20}$ aromatic radical.

Various polyesters can be used in this invention, but thermoplastic polyesters that are obtained by polymerizing dicarboxylic acids and dihydroxy compounds are particularly preferred.

Aromatic dicarboxylic acids, for example, terephthalic acid, isophthalic acid, naphthalene dicarboxylic acid and the like, can be used as these bifunctional carboxylic acids, and mixtures of these can be used as needed. Among these, terephthalic acid is particularly preferred. Also, to the extent that the effects of this invention are not lost, other bifunctional carboxylic acids such as aliphatic dicarboxylic acids can be used, such as oxalic acid, malonic acid, adipic acid, suberic acid, azelaic acid, sebacic acid, decane dicarboxylic acid, and cyclohexane dicarboxylic acid; and their ester-modified derivatives can also be used.

As dihydroxy compounds, straight chain aliphatic and cycloaliphatic diols having 2 to 15 carbon atoms can be used; for example, ethylene glycol, propylene glycol, 1,4-butanediol, trimethylene glycol, tetramethylene glycol, neopentyl glycol, diethylene glycol, cyclohexane dimethanol, heptane-1,7-diol, octane-1,8-diol, neopentyl glycol, decane-1,10-diol, etc.; polyethylene glycol; bivalent phenols such as dihydroxydiarylalkanes such as 2,2-bis(4-hydroxylphenyl) propane that can be called bisphenol-A, bis(4-hydroxyphenyl) methane, bis(4-hydroxyphenyl)naphthylmethane, bis (4-hydroxyphenyl)phenylmethane, bis(4-hydroxyphenyl)-(4-isopropylphenyl)methane, bis(3,5-dichloro-4-hydroxyphenyl)methane, bis(3,5-dimethyl-4-hydroxyphenyl)methane, 1,1-bis(4-hydroxyphenyl)ethane, 1-naphthyl-1,1-bis(4-hydroxyphenyl)ethane, 1-phenyl-1,1-bis(4-hydroxyphenyl)ethane, 1,2-bis(4-hydroxyphenyl)ethane, 2-methyl-1,1-bis(4-hydroxyphenyl)propane, 2,2-bis(3,5-dimethyl-4-hydroxyphenyl)propane, 1-ethyl-1,1-bis(4-hydroxyphenyl)propane, 2,2-bis(3,5-dichloro-4-hydroxyphenyl)propane, 2,2-bis(3,5-dibromo-4-hydroxyphenyl)propane, 2,2-bis(3-chloro-4-hydroxyphenyl)propane, 2,2-bis(3-methyl-4-hydroxyphenyl)propane, 2,2-bis(3-fluoro-4-hydroxyphenyl) propane, 1,1-bis(4-hydroxyphenyl)butane, 2,2-bis(4-hydroxyphenyl)butane, 1,4-bis(4-hydroxyphenyl)butane, 2,2-bis(4-hydroxyphenyl)pentane, 4-methyl-2,2-bis(4-hydroxyphenyl)pentane, 2,2-bis(4-hydroxyphenyl)hexane, 4,4-bis(4-hydroxyphenyl)heptane, 2,2-bis(4-hydroxyphenyl)nonane, 1,10-bis(4-hydroxyphenyl)decane, 1,1-bis(4-hydroxyphenyl)-3,3,5-trimethylcyclohexane, and 2,2-bis(4-hydroxyphenyl)-1,1,1,3,3,3-hexafluoropropane; dihyroxydiarylcycloalkanes such as 1,1-bis(4-hydroxyphenyl)cyclohexane, 1,1-bis(3,5-dichloro-4-hydroxyphenyl)cyclohexane, and 1,1-bis(4-hydroxyphenyl)cyclodecane; dihydroxydiarylsulfones such as bis(4-hydroxyphenyl)sulfone, and bis(3,5-dimethyl-4-hydroxyphenyl)sulfone, bis(3-chloro-4-hydroxyphenyl)sulfone; dihydroxydiarylethers such as bis(4-hydroxyphenyl)ether, and bis(3-5-dimethyl-4-hydroxyphenyl)ether; dihydroxydiaryl ketones such as 4,4'-dihydroxybenzophenone, and 3,3',5,5'-tetramethyl-4,4-dydroxybenzophenone; dihydroxydiaryl sulfides such as bis (4-hydroxyphenyl)sulfide, bis(3-methyl-4-hydroxyphenyl) sulfide, and bis(3,5-dimethyl-4-hydroxyphenyl)sulfide; dihydroxydiaryl sulfoxides such as bis(4-hydroxyphenyl) sulfoxide; dihydroxydiphenyls such as 4,4'-dihydroxyphenyl; dihydroxyarylfluorenes such as 9,9-bis(4-hydroxyphenyl)fluorene; dihydroxybenzenes such as hydroxyquinone, resorcinol, and methylhydroxyquinone; and dihydroxynaphthalenes such as 1,5-dihydroxynaphthalene and 2,6-dihydroxynaphthalene. Also, two or more kinds of dihydroxy compounds can be combined as needed.

In a specific embodiment, the polyester is poly(ethylene terephthalate) (PET), poly(1,4-butylene terephthalate) (PBT), poly(ethylene naphthalate) (PEN), poly(butylene naphthalate) (PBN), and poly(1,3-propylene terephthalate) (PPT), and poly(cyclohexylenedimethylene terephthalate) (PCT), polytrimethylene terephthalate (PTT), poly(1,4-butylene succinate) (PBS), glycol modified polycyclohexylenedimethylene terephthalate (PCTG/PETG), poly(1,4-cyclohexylenedimethylene) 1,4-cyclohexanedicarboxylic acid (PCCD), or combinations thereof. In one embodiment, the polyester is PET or PBT.

Polyesters that are used this invention can be a single kind of thermoplastic polyester used alone, or two or more kinds used in combination. Furthermore, copolyesters can also be used as needed.

In one embodiment, the composition comprises about 30 to about 80 percent by weight of a polyester based on the total weight of the composition. In another embodiment, the composition comprises 40 to about 70 percent by weight of a polyester. In another embodiment, the composition comprises 50 to about 60 percent by weight of a polyester. In another embodiment, the composition comprises 52 to about 58 percent by weight of a polyester. In another embodiment, the composition comprises 54 to about 57 percent by weight of a polyester. In a particular embodiment, the polyester is PBT. More specifically, the polyester is PBT with a weight average molecular weight (Mw) of 10,000 to 150,000, and more specifically from 40,000 to 110,000.

In a particular embodiment, the composition comprises PBT which is a mixture containing 6 percent PBT with an intrinsic viscosity of 1.2 $cm^3/g$ as measured in a 60:40 phenol/tetrachloroethane mixture (available from SABIC Innovative Plastics as PBT 315); and 49-62 percent by weight of PBT with an intrinsic viscosity of 0.66 $cm^3/g$ as measured in a 60:40 phenol/tetrachloroethane mixture (available from SABIC Innovative Plastics as PBT 195).

In another particular embodiment, the composition comprises PBT which is a mixture containing 6 percent PBT with an intrinsic viscosity of 1.2 $cm^3/g$ as measured in a 60:40 phenol/tetrachloroethane mixture (available from SABIC Innovative Plastics as PBT 315); and 49 to 52 percent by weight of PBT with an intrinsic viscosity of 0.66 $cm^3/g$ as measured in a 60:40 phenol/tetrachloroethane mixture (available from SABIC Innovative Plastics as PBT 195).

In another particular embodiment, the composition comprises PBT which is a mixture containing 6 percent PBT with an intrinsic viscosity of 1.2 $cm^3/g$ as measured in a 60:40 phenol/tetrachloroethane mixture (available from SABIC Innovative Plastics as PBT 315); and 60-62 percent by weight of PBT with an intrinsic viscosity of 0.66 $cm^3/g$ as measured in a 60:40 phenol/tetrachloroethane mixture (available from SABIC Innovative Plastics as PBT 195).

Brominated Flame Retardant Compound

In addition to the polyester, the composition contains a brominated flame retardant compound. Brominated flame retardant compounds useful in the practice of this invention include tetrabromobisphenol A polycarbonate oligomer, polybromophenyl ether, brominated polystyrene, brominated BPA polyepoxide, brominated imides, brominated polycarbonate, poly(bromoaryl acrylate), poly(bromoaryl methacrylate), or mixtures thereof.

Other suitable flame retardants are brominated polystyrenes such as polydibromostyrene and polytribromostyrene, decabromobiphenyl ethane, tetrabromobiphenyl, brominated alpha, omega-alkylene-bis-phthalimides, e.g. N,N'-ethylene-bis-tetrabromophthalimide, oligomeric brominated carbonates, especially carbonates derived from tetrabromobisphenol A, which, if desired, are end-capped with phenoxy radicals, or with brominated phenoxy radicals, or brominated epoxy resins.

In one embodiment, the brominated flame retardant compound is selected from the group consisting of decabromodiphenyl ether (Deca-BDE), decabromodiphenyl ethane (DBDPE), poly(pentabromobenzylacrylate (Br-acrylate), tetrabromobisphenol A (TBBPA), TBBPA oligomer, hexabromocyclododecane (HBCD), polybromophenyl ether, tetrabromo bisphenol A-tetrabromobisphenol A diglycidyl ether (brominated epoxide), brominated polystyrene (Br-PS), brominated imide, brominated polycarbonate (Br-PC), 2,4,6-tribromophenyl terminated TBBPA, TBBPA carbonate oligomer, or combinations thereof.

More particularly, the brominated flame retardant compound is selected from the group consisting of phenoxy-terminated tetrabrombisphenol A carbonate oligomer (TBBPA) which is available as BC-52, CAS Reg. No. 71342-77-3 from ICL-IP; 2,4,6-tribromophenyl-terminated tetrabrombisphenol A carbonate oligomer, which is available as BC-58, CAS Reg. No. 71342773, from ICL-IP; decabromodiphenylethane (DBDPE), CAS Reg. No. 84852-53-9, from Albemarle Corporation; poly(pentabromobenzylacrylate) (Br-Acrylate) CAS Reg. No. 59447-57-3, from ICL-IP; tetrabromo bisphenol A-tetrabromobisphenol A diglycidyl ether (Br-Epoxy), CAS Reg. No. 68928-70-1, from Sakamoto Yakuhin Kogyo; brominated polystyrene (Br-PS), CAS Reg. No. 88497-56-7, from Albemarle Corporation; and brominated polycarbonate (Br-PC) which is a copolymer comprising units ofbisphenol A (CAS Reg. No. 111211-39-3) and tetrabromobisphenol A, 24-29 percent bromine by weight (CAS Reg. No. 156042-31-8)

In one embodiment, the brominated polycarbonate is a copolycarbonate prepared from brominated and unbrominated dihydroxy compounds. In this embodiment, the ratio of brominated units to unbrominated units in the copolycarbonate is chosen to provide an amount of bromine of about 1 to about 45 weight percent, preferably about 10 to about 40 weight percent, more preferably about 15 to about 35 weight percent, and yet more preferably about 20 to about 30 weight percent based on the total weight of the copolycarbonate. A preferred brominated polycarbonate is a copolycarbonate comprising structural units derived from bisphenol A and tetrabromobisphenol A.

In one embodiment, the composition comprises about 3 to about 30 percent by weight of the brominated flame retardant compound based on the total weight of the composition. In another embodiment, the composition comprises about 6 to about 17 percent by weight of the brominated flame retardant compound. In another embodiment, the composition comprises about 8 to about 14 percent by weight of the brominated flame retardant compound. In another embodiment, the composition comprises about 10 to about 12 percent by weight of the brominated flame retardant compound.

Antimony Flame Retardant Compound

In addition to the polyester and the brominated flame retardant compound, the composition contains an antimony flame retardant compound. "Antimony flame retardant compound" means a flame retardant compound such as antimony trioxide ($Sb_2O_3$), antimony pentoxide ($Sb_2O_5$), and antimony-metal compounds, such as sodium antimonate ($Na_2SbO_4$). In one particular embodiment, the antimony flame retardant compound is $Sb_2O_3$.

In one embodiment, the composition comprises about 0.1 to about 5 percent by weight of $Sb_2O_3$ based on the total weight of the composition. In another embodiment, the composition comprises about 0.5 to about 4.5 percent by weight of $Sb_2O_3$. In another embodiment, the composition comprises about 1 to about 4 percent by weight of $Sb_2O_3$. In another embodiment, the composition comprises about 1 to about 2 percent by weight of $Sb_2O_3$.

Filler

In addition to the polyester, brominated flame retardant compound, antimony flame retardant compound, and glass fibers, the composition contains a filler comprising calcium oxide, as well as additional, optional fillers. Other fillers contemplated for use in the composition include inorganic fillers such as alumina, amorphous silica, anhydrous aluminum silicates, mica, feldspar, clays, talc, glass flake, glass microspheres, wollastonite, metal oxides such as titanium dioxide, zinc oxide, ground quartz, and the like. A preferred optional, additional filler is talc. The talc may be coated, surface treated, or untreated. A variety of treated talcs are commercially available, for instance, from Mineral Technologies, Inc.

In one embodiment of this method, the filler is calcium oxide. In another embodiment, the filler is a combination of talc and calcium oxide. In this and other embodiments, the talc and calcium oxide are separate components that, when combined, form a combination. In one embodiment, about 0.01 to about 2.5 percent by weight of the filler are present, where the filler is a combination of calcium oxide and talc. In this and other embodiments, the talc and calcium oxide are separate components. In one embodiment, the composition contains from about 0.05 to about 2.5 weight percent calcium oxide and 1.5 to 3 weight percent talc. In one embodiment, the composition contains about 0.15 weight percent calcium oxide and about 2.85 weight percent talc, based on the total weight of the composition.

Glass Fiber

In addition to the polyester, brominated flame retardant compound, antimony flame retardant compound, and filler, the composition optionally contains glass fiber. Glass fibers may be composed of E-glass or alkali metal silicate glass and may comprise short, chopped glass fibers with a circular cross section ranging in diameter from about $2 \times 10^{-4}$ to $8 \times 10^{-4}$ inch and about 0.2 to 2 cm in length. Such glass fibers can be supplied by the manufacturers with a surface treatment compatible with the polymer component of the composition, such as a siloxane or polyurethane sizing.

In one embodiment, the fiber is borosilicate glass fiber (CAS Reg. No. 65997-17-3) not having a surface treatment, obtained from Chongqing Polycomp International Corp. When used in the composition, the glass fiber is normally included at a level of from about 1 to 50 percent by weight, more preferably from about 5 to 45 percent by weight, and more preferably 20 to about 40 percent, and more preferably 25 to about 35 weight percent based on the total weight of the composition.

Antidrip Agent

In addition to the polyester, brominated flame retardant compound, antimony compound, glass fiber and filler, the composition optionally contains an antidrip agent. The term "antidrip" refers to an additive which increases the melt strength of the polycarbonate, thereby reducing the tendency of the resin, when heated to close to melting, to drip. Examples of suitable antidrip agents include PTFE-based antidrip agents, such as 1/1 dispersion of PTFE in styrene acrylonitrile resin, emulsion based PTFE, and steam-precipitated PTFE.

The antidrip agent is added in an amount effective to increase the melt strength and reduce drip, for example in the range of from 0.01 to 2 weight percent polytetrafluoroethylene resin is well known in the art. Polytetrafluoroethylene resin is typically a finely-divided solid that, when exposed to mechanical shear, has the ability to form ultrafine fibrils.

Polytetrafluoroethylene is commercially available, typically as an aqueous suspension. It is preferable for ease of dispersion that the polytetrafluoroethylene resin particles be pre-dispersed in a resin matrix such as a thermoplastic resin for example, styrene-acrylonitrile as taught in European Patent Application No. 899 303. The encapsulated polytetrafluoroethylene resin particles typically have a particle size of about 35 to about 70 micrometers with about 40 to about 65 micrometers preferred. The polytetrafluoroethylene resin is typically employed in amounts less than about 0.1 weight percent, preferably less than or equal to about 0.075 weight percent, and most preferably less than or equal to about 0.05 weight percent, each based on the total weight of the polycarbonate. The fluorinated polyolefin must be employed in amounts effective to prevent dripping of the composition during heating, typically greater than or equal to about 0.025 weight percent.

Other Additives

The composition of the present invention may include additives which do not interfere with the previously mentioned desirable properties but enhance other favorable properties such as anti-oxidants, flame retardants, reinforcing materials, colorants, mold release agents, fillers, nucleating agents, heat stabilizers, lubricants, and the like. Additionally, additives such as antioxidants, and other stabilizers including but not limited to UV stabilizers, such as benzotriazole, pigments or combinations thereof may be added to the compositions of the present invention. The additives can be present in an amount between about 0 and about 50 weight percent by weight. The different additives that can be incorporated in the compositions are commonly used and known to one skilled in the art. Illustrative descriptions of such additives may be found in R. Gachter and H. Muller, Plastics Additives Handbook, 6th edition, 2009.

Method

In one aspect, the invention provides a method of reducing the amount of antimony flame retardant compound in a flame retardant composition which comprises using calcium oxide or a combination of talc and calcium oxide as a filler in the composition, wherein the composition comprises:
(a) 30 to 80 percent by weight of a polyester;
(b) 3 to 30 percent by weight of a brominated flame retardant compound;
(c) 0.1 to 5 percent by weight of an antimony flame retardant compound;
(d) 0.01 to 5 percent by weight of a filler comprising calcium oxide or a combination of talc and calcium oxide; and wherein:
  (i) the composition meets or exceeds the requirements of UL94-V2;
  (ii) less antimony retardant compound is present in the composition comprising (a), (b), (c), and (d) as compared to a composition comprising component (a), (b), (c) and no (d);
  (iii) the comparative tracking index (CTI) is the same as or greater than the CTI for a corresponding composition comprising (a), (b), (c), and (d) as compared to a composition comprising component (a), (b), (c) and no (d);
and wherein the weight percents are based on the total weight of the composition.

In one embodiment of this method, the filler is calcium oxide.

In another embodiment, the filler is a combination of talc and calcium oxide. In this and other embodiments, the talc and calcium oxide are separate components. In another embodiment, the talc contains calcium oxide.

In another embodiment of the method, the polyester is PET, PBT, or a combination thereof.

More particularly, the polyester is PBT.

In another particular embodiment, the composition comprises PBT which is a mixture containing 6 percent PBT with an intrinsic viscosity of 1.2 $cm^3/g$ as measured in a 60:40 phenol/tetrachloroethane mixture (available from SABIC Innovative Plastics as PBT 315); and 60-62 percent by weight of PBT with an intrinsic viscosity of 0.66 $cm^3/g$ as measured in a 60:40 phenol/tetrachloroethane mixture (available from SABIC Innovative Plastics as PBT 195).

In another embodiment of the method, the brominated flame retardant compound is selected from the group consisting of DBDPE, TBBPA carbonate oligomer, 2,4,6-tribromophenyl terminated TBBPA, Br-acrylate, Br-epoxy, Br-PS, and Br-PC, or combinations thereof.

In another embodiment of the method, the antimony flame retardant compound is antimony trioxide ($Sb_2O_3$).

In another embodiment, the invention provides a method of reducing the amount of antimony flame retardant compound in a flame retardant composition which comprises using calcium oxide or a combination of talc and calcium oxide as a filler in the composition, wherein the composition comprises:
(a) 65 to 70 percent by weight of a polyester;
(b) 20 to 30 percent by weight of a brominated flame retardant compound;
(c) 2 to 4 percent by weight of an antimony flame retardant compound;
(d) about 2.5 percent to 3.5 percent by weight of a filler comprising a combination of talc and calcium oxide; and wherein:
  (i) the composition meets or exceeds the requirements of UL94-V2;
  (ii) less antimony retardant compound is present in the composition comprising (a), (b), (c), and (d) as compared to a composition comprising component (a), (b), (c) and no (d);
  (iii) the comparative tracking index (CTI) is the same as or greater than the CTI for a corresponding composition comprising (a), (b), (c), and (d) as compared to a composition comprising component (a), (b), (c) and no (d);
and wherein the weight percents are based on the total weight of the composition.

In another embodiment, the invention provides a method of reducing the amount of antimony flame retardant compound in a flame retardant composition which comprises using a combination of talc and calcium oxide as a filler in the composition, wherein the composition comprises:
(a) 65 to 70 percent by weight of a polyester which is PBT;
(b) 20 to 30 percent by weight of a brominated flame retardant compound;
(c) 2 to 4 percent by weight of $Sb_2O_3$;

(d1) about 2.75 percent to 3.0 percent by weight of talc; and (d2) about 0.1 to about 0.2 percent by weight of calcium oxide; and wherein:

(i) the composition meets or exceeds the requirements of UL94-V2;

(ii) less antimony retardant compound is present in the composition comprising (a), (b), (c), and (d) as compared to a composition comprising component (a), (b), (c) and no (d);

(iii) the comparative tracking index (CTI) is the same as or greater than the CTI for a corresponding composition comprising (a), (b), (c), and (d) as compared to a composition comprising component (a), (b), (c) and no (d);

and wherein the weight percents are based on the total weight of the composition.

In another embodiment, the invention provides a method of reducing the amount of antimony flame retardant compound in a flame retardant composition which comprises using a combination of talc and calcium oxide as a filler in the composition, wherein the composition comprises:

(a) 60-62 percent by weight of PBT with an intrinsic viscosity of 0.66 cm³/g as measured in a 60:40 phenol/tetrachloroethane and 6 percent by weight of PBT with an intrinsic viscosity of 1.2 cm3/g as measured in a 60:40 phenol/tetrachloroethane mixture;

(b) 20 to 30 percent by weight of a brominated flame retardant compound;

(c) 2 to 4 percent by weight of an antimony flame retardant compound;

(d) about 2.5 percent to 3.5 percent by weight of a filler comprising a combination of talc and calcium oxide; and wherein:

(i) the composition meets or exceeds the requirements of UL94-V2;

(ii) less antimony retardant compound is present in the composition comprising (a), (b), (c), and (d) as compared to a composition comprising component (a), (b), (c) and no (d);

(iii) the comparative tracking index (CTI) is the same as or greater than the CTI for a corresponding composition comprising (a), (b), (c), and (d) as compared to a composition comprising component (a), (b), (c) and no (d);

and wherein the weight percents are based on the total weight of the composition.

In a particular embodiment, the brominated flame retardant compound is Br-Pc. More particularly, this embodiment comprises about 26 to 30 weight percent of Br-PC.

In another embodiment of the method, the admixture of talc and calcium oxide contains about 0.15 weight percent of calcium oxide and about 2.85 weight percent of talc.

In a particular further embodiment, this embodiment further comprises a stabilizer. In a particular embodiment, the stabilizer is pentaerythritol tetrakis(3,5-di-tert-butyl-4-hydroxyhydrocinnamate) (CAS Reg. No. 6683-19-8). More particularly, this embodiment comprises 0.05 to about 0.07 weight percent of the stabilizer which is pentaerythritol tetrakis(3,5-di-tert-butyl-4-hydroxyhydrocinnamate).

In a particular further embodiment, this composition further comprises a mold release agent. In a particular embodiment, the mold release agent is low density polyethylene (LDPE).

In another embodiment of the method, the composition contains about 1.5 to about 1.7 weight percent $Sb_2O_3$, based on the total weight of the composition.

In another embodiment the compositions of the method further comprise 0.01 to 50 percent by weight of glass fiber.

In another embodiment, the composition of the method further comprises 20 to 40 by weight of glass fiber.

In another embodiment, the composition of the method comprises 0.01 to 2 weight percent of an antidrip agent.

In a further embodiment, the antidrip agent is polytetrafluoroethylene.

In another embodiment, the CTI is 200 V or greater.

In another embodiment, the method comprises reducing the amount of antimony flame retardant compound in a flame retardant composition which comprises using a filler comprising a combination of talc and calcium oxide, wherein the composition comprises:

(a) 55 to 57 percent by weight of PBT;

(b) 9 to 11 percent by weight of a brominated flame retardant compound he brominated flame retardant compound is selected from the group consisting of DBDPE, TBBPA carbonate oligomer, 2,4,6-tribromophenyl terminated TBBPA, Br-acrylate, Br-epoxy, Br-PS, and Br-PC, or combinations thereof;

(c) 1.5 to 1.7 percent by weight of $Sb_2O_3$;

(d) 28 to 32 percent by weight of glass fiber;

(e1) about 0.05-0.15 percent by weight of calcium oxide; and (e2) about 1.25-1.75 percent by weight of talc; and wherein (i) the composition meets or exceeds the requirements of UL94-V2; and (ii) less $Sb_2O_3$ is present in the composition comprising (a), (b), (c), (d), (e1), and (e2), and as compared to a composition not comprising component (a), (b), (c), and (d);

(iii) the comparative tracking index (CTI) of the composition comprising (a), (b), (c), (d), (e1), (e2), and (f) is the same as or greater than the CTI for a corresponding composition as compared to a composition c comprising (a), (b), (c), (d), (e1), and (e2), and as compared to a composition not comprising component (a), (b), (c), and (d);

and wherein the weight percents are based on the total weight of the composition.

In another particular embodiment, the composition comprises PBT which is a mixture containing 6 percent PBT with an intrinsic viscosity of 1.2 cm³/g as measured in a 60:40 phenol/tetrachloroethane mixture (available from SABIC Innovative Plastics as PBT 315); and 49 to 52 percent by weight of PBT with an intrinsic viscosity of 0.66 cm³/g as measured in a 60:40 phenol/tetrachloroethane mixture (available from SABIC Innovative Plastics as PBT 195).

In another embodiment, the method comprises reducing the amount of antimony flame retardant compound in a flame retardant composition which comprises using a filler comprising a combination of talc and calcium oxide, wherein the composition comprises:

(a) 55 to 57 percent by weight of PBT;

(b) 9 to 11 percent by weight of phenoxy-terminated tetrabrombisphenol A carbonate oligomer;

(c) 1.5 to 1.7 percent by weight of $Sb_2O_3$;

(d) 28 to 32 percent by weight of glass fiber;

(e1) about 0.05-0.15 percent by weight of calcium oxide; and (e2) about 1.25-1.75 percent by weight of talc; and wherein (i) the composition meets or exceeds the requirements of UL94-V2; and (ii) less $Sb_2O_3$ is present in the composition comprising (a), (b), (c), (d), (e1), and (e2), and as compared to a composition not comprising component (a), (b), (c), and (d);

(iii) the comparative tracking index (CTI) of the composition comprising (a), (b), (c), (d), (e1), (e2), and (f) is the same as or greater than the CTI for a corresponding composition as compared to a composition c comprising (a), (b), (c), (d), (e1), and (e2), and as compared to a composition not comprising component (a), (b), (c), and (d);

and wherein the weight percents are based on the total weight of the composition.

In another embodiment, the method comprises reducing the amount of antimony flame retardant compound in a flame retardant composition which comprises using a filler comprising a combination of talc and calcium oxide, wherein the composition comprises:

(a) 49 to 52 percent by weight of PBT with an intrinsic viscosity of 0.66 $cm^3/g$ as measured in a 60:40 phenol/tetrachloroethane mixture and 6 percent by weight of PBT with an intrinsic viscosity of 1.2 cm3/g as measured in a 60:40 phenol/tetrachloroethane mixture;

(b) 9 to 11 percent by weight of phenoxy-terminated tetrabrombisphenol A carbonate oligomer;

(c) 1.5 to 1.7 percent by weight of $Sb_2O_3$;

(d) 28 to 32 percent by weight of glass fiber;

(e1) about 0.05-0.15 percent by weight of calcium oxide; and (e2) about 1.25-1.75 percent by weight of talc; and wherein (i) the composition meets or exceeds the requirements of UL94-V2; and (ii) less $Sb_2O_3$ is present in the composition comprising (a), (b), (c), (d), (e1), and (e2), and as compared to a composition not comprising component (a), (b), (c), and (d);

(iii) the comparative tracking index (CTI) of the composition comprising (a), (b), (c), (d), (e1), (e2), and (f) is the same as or greater than the CTI for a corresponding composition as compared to a composition c comprising (a), (b), (c), (d), (e1), and (e2), and as compared to a composition not comprising component (a), (b), (c), and (d);

and wherein the weight percents are based on the total weight of the composition.

In a particular further embodiment, this embodiment further comprises a stabilizer. In a particular embodiment, the stabilizer is pentaerythritol tetrakis(3,5-di-tert-butyl-4-hydroxyhydrocinnamate) (CAS Reg. No. 6683-19-8). More particularly, this embodiment comprises 0.05 to about 0.07 weight percent of the stabilizer which is pentaerythritol tetrakis(3,5-di-tert-butyl-4-hydroxyhydrocinnamate.

In a particular further embodiment, this embodiment further comprises a mold release agent. In a particular embodiment, the mold release agent is LDPE. More particularly, this embodiment comprises 0.1 to about 0.3 weight percent of the mold release agent which is LDPE.

In another embodiment, the method comprises reducing the amount of antimony flame retardant compound in a flame retardant composition which comprises using a filler comprising a combination of talc and calcium oxide, wherein the composition comprises:

(a) 49 to 52 percent by weight of PBT with an intrinsic viscosity of 0.66 $cm^3/g$ as measured in a 60:40 phenol/tetrachloroethane mixture and 6 percent by weight of PBT with an intrinsic viscosity of 1.2 cm3/g as measured in a 60:40 phenol/tetrachloroethane mixture;

(b) 9 to 11 percent by weight of phenoxy-terminated tetrabrombisphenol A carbonate oligomer;

(c) 1.5 to 1.7 percent by weight of $Sb_2O_3$;

(d) 28 to 32 percent by weight of glass fiber;

(e1) about 0.05-0.15 percent by weight of calcium oxide;

(e2) about 1.25-1.75 percent by weight of talc;

(g) about 0.1 to about 0.3 weight percent of a mold release agent;

(h) about 0.05 to about 0.07 weight percent of a stabilizer; and wherein (i) the composition meets or exceeds the requirements of UL94-V2; and (ii) less $Sb_2O_3$ is present in the composition comprising (a), (b), (c), (d), (e1), and (e2), and as compared to a composition not comprising component (a), (b), (c), and (d);

(iii) the comparative tracking index (CTI) of the composition comprising (a), (b), (c), (d), (e1), (e2), and (f) is the same as or greater than the CTI for a corresponding composition as compared to a composition c comprising (a), (b), (c), (d), (e1), and (e2), and as compared to a composition not comprising component (a), (b), (c), and (d);

and wherein the weight percents are based on the total weight of the composition.

In another embodiment, the method comprises reducing the amount of antimony flame retardant compound in a flame retardant composition which comprises using a filler comprising a combination of talc and calcium oxide, wherein the composition comprises:

(a) 49 to 52 percent by weight of PBT with an intrinsic viscosity of 0.66 $cm^3/g$ as measured in a 60:40 phenol/tetrachloroethane mixture and 6 percent by weight of PBT with an intrinsic viscosity of 1.2 cm3/g as measured in a 60:40 phenol/tetrachloroethane mixture;

(b) 9 to 11 percent by weight of phenoxy-terminated tetrabrombisphenol A carbonate oligomer;

(c) 1.5 to 1.7 percent by weight of $Sb_2O_3$;

(d) 28 to 32 percent by weight of glass fiber;

(e1) about 0.05-0.15 percent by weight of calcium oxide;

(e2) about 1.25-1.75 percent by weight of talc;

(g) about 0.1 to about 0.3 weight percent of a mold release agent;

(h) about 0.05 to about 0.07 weight percent of a stabilizer; and wherein (i) the composition meets or exceeds the requirements of UL94-V2; and (ii) less $Sb_2O_3$ is present in the composition comprising (a), (b), (c), (d), (e1), and (e2), and as compared to a composition not comprising component (a), (b), (c), and (d);

(iii) the comparative tracking index (CTI) of the composition comprising (a), (b), (c), (d), (e1), (e2), and (f) is the same as or greater than the CTI for a corresponding composition as compared to a composition c comprising (a), (b), (c), (d), (e1), and (e2), and as compared to a composition not comprising component (a), (b), (c), and (d);

and wherein the weight percents are based on the total weight of the composition.

In another embodiment of the method, the composition comprises:

(a) 45 to 65 percent by weight of a polyester;

(b) 7 to 13 percent by weight of a brominated flame retardant compound which is DBDPE, TBBPA carbonate oligomer, 2,4,6-tribromophenyl terminated TBBPA, Br-acrylate, Br-epoxy, and Br-PS, or combinations thereof;
(c) 1 to 3 percent by weight of $Sb_2O_3$;
(d) 25 to 45 percent by weight of glass fiber;
(e) 0.01 to 5 percent by weight of a filler comprising calcium oxide or a combination of talc and calcium oxide; and
(f) 0.01 to 2 percent by weight of an antidrip agent;
and wherein the weight percents are based on the total weight of the composition.

In another embodiment of the method, the composition comprises:
(a) 45 to 65 percent by weight of a polyester which is PBT or PET or a mixture thereof;
(b) 7 to 13 percent by weight of a brominated flame retardant compound which is DBDPE, TBBPA carbonate oligomer, 2,4,6-tribromophenyl terminated TBBPA, Br-acrylate, Br-epoxy, and Br-PS, or combinations thereof;
(c) 1 to 3 percent by weight of $Sb_2O_3$;
(d) 25 to 45 percent by weight of glass fiber;
(e) 0.01 to 5 percent by weight of a filler comprising calcium oxide or a combination of talc and calcium oxide; and
(f) 0.01 to 2 percent by weight of an antidrip agent;
and wherein the weight percents are based on the total weight of the composition.

In another embodiment of the method, the composition comprises:
(a) 45 to 65 percent by weight of PBT;
(b) 7 to 13 percent by weight of a brominated flame retardant compound which is DBDPE, TBBPA carbonate oligomer, 2,4,6-tribromophenyl terminated TBBPA, Br-acrylate, Br-epoxy, and Br-PS, or combinations thereof;
(c) 1 to 3 percent by weight of $Sb_2O_3$;
(d) 25 to 45 percent by weight of glass fiber;
(e) 0.01 to 5 percent by weight of a filler comprising calcium oxide; and
(f) 0.01 to 2 percent by weight of an antidrip agent;
and wherein the weight percents are based on the total weight of the composition.

In another embodiment of the method, the composition comprises:
(a) 55 to 57 percent by weight of PBT;
(b) 9 to 11 percent by weight of a brominated flame retardant compound which is DBDPE, TBBPA carbonate oligomer, 2,4,6-tribromophenyl terminated TBBPA, Br-acrylate, Br-epoxy, and Br-PS, or combinations thereof;
(c) 1.5 to 2 percent by weight of $Sb_2O_3$;
(d) 25 to 35 percent by weight of glass fiber; and
(e) 0.01 to 5 percent by weight of a filler comprising a combination of talc and calcium oxide; and
(f) 0.01 to 2 percent by weight of an antidrip agent;
and wherein the weight percents are based on the total weight of the composition.

In another embodiment of the method, the composition comprises:
(a) 55 to 57 percent by weight of PBT;
(b) 9 to 11 percent by weight of a brominated flame retardant compound which is TBBPA carbonate oligomer;
(c) 1.5 to 2 percent by weight of $Sb_2O_3$;
(d) 25 to 35 percent by weight of glass fiber; and
(e) 1.5 to 2.5 percent by weight of a filler comprising calcium oxide; and
(f) 0.01 to 2 percent by weight of an antidrip agent;
and wherein the weight percents are based on the total weight of the composition.

In another embodiment of the method, the composition comprises:
(a) 55 to 57 percent by weight of PBT;
(b) 9 to 11 percent by weight of a brominated flame retardant compound which is TBBPA carbonate oligomer;
(c) 1.5 to 2 percent by weight of $Sb_2O_3$;
(d) 25 to 35 percent by weight of glass fiber;
(e1) 0.05 to 0.15 percent of calcium oxide;
(e2) 1 to 2 percent by weight of talc; and
(f) 0.01 to 2 percent by weight of an antidrip agent;
and wherein the weight percents are based on the total weight of the composition.

In another embodiment of the method, the composition comprises:
(a) 55 to 57 percent by weight of PBT;
(b) 9 to 11 percent by weight of a brominated flame retardant compound;
(c) 1.5 to 2 percent by weight of $Sb_2O_3$;
(d) 28 to 32 percent by weight of glass fiber;
(e1) 0.05 to 0.15 percent by weight of calcium oxide; and
(e2) 1 to 2 percent by weight of talc; and
(f) 0.01 to 2 percent by weight of an antidrip agent;
and wherein the weight percents are based on the total weight of the composition.

In another embodiment, the method comprises reducing the amount of antimony flame retardant compound in a flame retardant composition which comprises using a filler comprising a combination of talc and calcium oxide, wherein the composition comprises:
(a) 49 to 52 percent by weight of PBT with an intrinsic viscosity of 0.66 cm³/g as measured in a 60:40 phenol/tetrachloroethane mixture and 6 percent by weight of PBT with an intrinsic viscosity of 1.2 cm3/g as measured in a 60:40 phenol/tetrachloroethane mixture;
(b) 9 to 11 percent by weight of a brominated flame retardant compound which is DBDPE, TBBPA carbonate oligomer, 2,4,6-tribromophenyl terminated TBBPA, Br-acrylate, Br-epoxy, and Br-PS, or combinations thereof;
(c) 1.5 to 1.7 percent by weight of $Sb_2O_3$;
(d) 28 to 32 percent by weight of glass fiber;
(e1) about 0.15 percent by weight of calcium oxide; and
(e2) about 2.85 percent by weight of talc; and
(f) 0.01 to 2 percent by weight of an antidrip agent; and wherein
(i) the composition meets or exceeds the requirements of UL94-V2; and
(ii) less $Sb_2O_3$ is present in the composition comprising (a), (b), (c), (d), (e1), (e2), and (f) and as compared to a composition not comprising component (a), (b), (c), (d), and (f);
(iii) the comparative tracking index (CTI) of the composition comprising (a), (b), (c), (d), (e1), (e2), and (f) is the same as or greater than the CTI for a corresponding composition as compared to a composition comprising component (a), (b), (c), (d), and (f);
and wherein the weight percents are based on the total weight of the composition.

Composition

In another aspect, the invention is directed to a flame retardant composition, comprising:
- (a) 30 to 80 percent by weight of a polyester;
- (b) 3 to 30 percent by weight of a brominated flame retardant compound;
- (c) 0.1 to 5 percent by weight of an antimony flame retardant compound;
- (d) 0.01 to 5 percent by weight of a filler comprising calcium oxide or a combination of talc and calcium oxide; and wherein:
  - (i) the composition meets or exceeds the requirements of UL94-V2;
  - (ii) less antimony retardant compound is present in the composition comprising (a), (b), (c), and (d) as compared to a composition comprising component (a), (b), (c) and no (d);
  - (iii) the comparative tracking index (CTI) is the same as or greater than the CTI for a corresponding composition comprising (a), (b), (c), and (d) as compared to a composition comprising component (a), (b), (c) and no (d);
  - and wherein the weight percents are based on the total weight of the composition.

In one embodiment, the filler is calcium oxide.

In another embodiment, the filler is a combination of talc and calcium oxide. In this and other embodiments, the talc and calcium oxide are separate components. In another embodiment, the talc contains calcium oxide.

In another embodiment, the polyester is PET, PBT, or a combination thereof.

In another embodiment, the polyester is PBT.

In another particular embodiment, the composition comprises PBT which is a mixture containing 6 percent PBT with an intrinsic viscosity of 1.2 cm$^3$/g as measured in a 60:40 phenol/tetrachloroethane mixture (available from SABIC Innovative Plastics as PBT 315); and 60-62 percent by weight of PBT with an intrinsic viscosity of 0.66 cm$^3$/g as measured in a 60:40 phenol/tetrachloroethane mixture (available from SABIC Innovative Plastics as PBT 195).

In another embodiment, the brominated flame retardant compound is selected from the group consisting of DBDPE, TBBPA carbonate oligomer, 2,4,6-tribromophenyl terminated TBBPA, Br-acrylate, Br-epoxy, Br-PS, and Br-PC, or combinations thereof.

In another embodiment, the antimony flame retardant compound is antimony oxide.

In another embodiment, the invention provides a flame retardant composition, comprising:
- (a) 65 to 70 percent by weight of a polyester;
- (b) 20 to 30 percent by weight of a brominated flame retardant compound;
- (c) 2 to 4 percent by weight of an antimony flame retardant compound;
- (d) about 2.5 percent to 3.5 percent by weight of a filler comprising a combination of talc and calcium oxide; and wherein:
  - (i) the composition meets or exceeds the requirements of UL94-V2;
  - (ii) less antimony retardant compound is present in the composition comprising (a), (b), (c), and (d) as compared to a composition comprising component (a), (b), (c) and no (d);
  - (iii) the comparative tracking index (CTI) is the same as or greater than the CTI for a corresponding composition comprising (a), (b), (c), and (d) as compared to a composition comprising component (a), (b), (c) and no (d);
  - and wherein the weight percents are based on the total weight of the composition.

In another embodiment, the invention provides a flame retardant composition, comprising:
- (a) 60-62 percent by weight of PBT with an intrinsic viscosity of 0.66 cm$^3$/g as measured in a 60:40 phenol/tetrachloroethane mixture and 6 percent by weight of PBT with an intrinsic viscosity of 1.2 cm3/g as measured in a 60:40 phenol/tetrachloroethane mixture;
- (b) 20 to 30 percent by weight of a brominated flame retardant compound;
- (c) 2 to 4 percent by weight of $Sb_2O_3$;
- (d1) about 2.75 percent to 3.0 percent by weight of talc; and
- (d2) about 0.1 to about 0.2 percent by weight of calcium oxide; and wherein:
  - (i) the composition meets or exceeds the requirements of UL94-V2;
  - (ii) less antimony retardant compound is present in the composition comprising (a), (b), (c), and (d) as compared to a composition comprising component (a), (b), (c) and no (d);
  - (iii) the comparative tracking index (CTI) is the same as or greater than the CTI for a corresponding composition comprising (a), (b), (c), and (d) as compared to a composition comprising component (a), (b), (c) and no (d);
  - and wherein the weight percents are based on the total weight of the composition.

In a particular embodiment, the brominated flame retardant compound is Br-Pc. More particularly, this embodiment comprises about 26 to 30 weight percent of Br-PC.

In a particular embodiment, the admixture of talc and calcium oxide contains about 0.15 weight percent calcium oxide and about 2.85 weight percent talc.

In a particular further embodiment, the composition comprises a stabilizer. In a particular embodiment, the stabilizer is pentaerythritol tetrakis(3,5-di-tert-butyl-4-hydroxyhydrocinnamate) (CAS Reg. No. 6683-19-8). More particularly, this embodiment comprises 0.05 to about 0.07 weight percent of the stabilizer which is pentaerythritol tetrakis(3,5-di-tert-butyl-4-hydroxyhydrocinnamate.

In a particular further embodiment, this embodiment further comprises a mold release agent.

In a particular embodiment, the mold release agent is LDPE. More particularly, this embodiment comprises 0.1 to about 0.3 weight percent of the mold release agent which is LDPE.

In another embodiment, the composition further comprises 0.01 to 50 by weight of glass fiber.

In another embodiment, the composition further comprises 20 to 40 by weight of glass fiber.

In another embodiment, the composition comprises 0.01 to 2 weight percent of an antidrip agent.

In a further embodiment, the antidrip agent is polytetrafluoroethylene.

In another embodiment, the CTI is 200 V or greater.

In another embodiment, the invention provides a flame retardant composition, comprising:
- (a) 55 to 57 percent by weight of PBT;
- (b) 9 to 11 percent by weight of phenoxy-terminated tetrabrombisphenol A carbonate oligomer;
- (c) 1.5 to 1.7 percent by weight of $Sb_2O_3$;
- (d) 28 to 32 percent by weight of glass fiber;

(e1) about 0.05-0.15 percent by weight of calcium oxide; and
(e2) about 1.25-1.75 percent by weight of talc; and wherein
  (i) the composition meets or exceeds the requirements of UL94-V2; and
  (ii) less $Sb_2O_3$ is present in the composition comprising (a), (b), (c), (d), (e1), and (e2), and as compared to a composition not comprising component (a), (b), (c), and (d);
  (iii) the comparative tracking index (CTI) of the composition comprising (a), (b), (c), (d), (e1), (e2), and (f) is the same as or greater than the CTI for a corresponding composition as compared to a composition c comprising (a), (b), (c), (d), (e1), and (e2), and as compared to a composition not comprising component (a), (b), (c), and (d);
and wherein the weight percents are based on the total weight of the composition.

In another particular embodiment, the composition comprises PBT which is a mixture containing 6 percent PBT with an intrinsic viscosity of 1.2 cm³/g as measured in a 60:40 phenol/tetrachloroethane mixture (available from SABIC Innovative Plastics as PBT 315); and 49 to 52 percent by weight of PBT with an intrinsic viscosity of 0.66 cm³/g as measured in a 60:40 phenol/tetrachloroethane mixture (available from SABIC Innovative Plastics as PBT 195).

In a particular further embodiment, this embodiment further comprises a stabilizer. In a particular embodiment, the stabilizer is pentaerythritol tetrakis(3,5-di-tert-butyl-4-hydroxyhydrocinnamate) (CAS Reg. No. 6683-19-8). More particularly, this embodiment comprises 0.05 to about 0.07 weight percent of the stabilizer which is pentaerythritol tetrakis(3,5-di-tert-butyl-4-hydroxyhydrocinnamate.

In a particular further embodiment, this embodiment further comprises a mold release agent. In a particular embodiment, the mold release agent is LDPE. More particularly, this embodiment comprises 0.1 to about 0.3 weight percent of the mold release agent which is LDPE.

In another embodiment, the invention provides a flame retardant composition, comprising:
(a) 49 to 52 percent by weight of PBT with an intrinsic viscosity of 0.66 cm³/g as measured in a 60:40 phenol/tetrachloroethane mixture and 6 percent by weight of PBT with an intrinsic viscosity of 1.2 cm3/g as measured in a 60:40 phenol/tetrachloroethane mixture;
(b) 9 to 11 percent by weight of phenoxy-terminated tetrabrombisphenol A carbonate oligomer;
(c) 1.5 to 1.7 percent by weight of $Sb_2O_3$;
(d) 28 to 32 percent by weight of glass fiber;
(e1) about 0.05-0.15 percent by weight of calcium oxide;
(e2) about 1.25-1.75 percent by weight of talc;
(g) about 0.1 to about 0.3 weight percent of a mold release agent;
(h) about 0.05 to about 0.07 weight percent of a stabilizer; and wherein
  (i) the composition meets or exceeds the requirements of UL94-V2; and
  (ii) less $Sb_2O_3$ is present in the composition comprising (a), (b), (c), (d), (e1), and (e2), and as compared to a composition not comprising component (a), (b), (c), and (d);
  (iii) the comparative tracking index (CTI) of the composition comprising (a), (b), (c), (d), (e1), (e2), and (f) is the same as or greater than the CTI for a corresponding composition as compared to a composition c comprising (a), (b), (c), (d), (e1), and (e2), and as compared to a composition not comprising component (a), (b), (c), and (d);
and wherein the weight percents are based on the total weight of the composition.

In another embodiment, the composition comprises:
(a) 45 to 65 percent by weight of a polyester;
(b) 7 to 13 percent by weight of a brominated flame retardant compound which is DBDPE, TBBPA carbonate oligomer, 2,4,6-tribromophenyl terminated TBBPA, Br-acrylate, Br-epoxy, and Br-PS, or combinations thereof;
(c) 1 to 3 percent by weight of $Sb_2O_3$;
(d) 25 to 45 percent by weight of glass fiber;
(e) 0.01 to 5 percent by weight of a filler comprising calcium oxide or a combination of talc and calcium oxide; and
(f) 0.01 to 2 percent by weight of an antidrip agent;
and wherein the weight percents are based on the total weight of the composition.

In another embodiment, the composition comprises:
(a) 45 to 65 percent by weight of a polyester which is PBT or PET or a mixture thereof;
(b) 7 to 13 percent by weight of a brominated flame retardant compound which is DBDPE, TBBPA carbonate oligomer, 2,4,6-tribromophenyl terminated TBBPA, Br-acrylate, Br-epoxy, and Br-PS, or combinations thereof;
(c) 1 to 3 percent by weight of $Sb_2O_3$;
(d) 25 to 45 percent by weight of glass fiber;
(e) 0.01 to 5 percent by weight of a filler comprising calcium oxide or a combination of talc and calcium oxide; and
(f) 0.01 to 2 percent by weight of an antidrip agent;
and wherein the weight percents are based on the total weight of the composition.

In another embodiment of the method, the composition comprises:
(a) 45 to 65 percent by weight of PBT;
(b) 7 to 13 percent by weight of a brominated flame retardant compound which is DBDPE, TBBPA carbonate oligomer, 2,4,6-tribromophenyl terminated TBBPA, Br-acrylate, Br-epoxy, and Br-PS, or combinations thereof;
(c) 1 to 3 percent by weight of $Sb_2O_3$;
(d) 25 to 45 percent by weight of glass fiber;
(e) 0.01 to 5 percent by weight of a filler comprising calcium oxide; and
(f) 0.01 to 2 percent by weight of an antidrip agent;
and wherein the weight percents are based on the total weight of the composition.

In another embodiment, the composition comprises:
(a) 55 to 57 percent by weight of PBT;
(b) 9 to 11 percent by weight of a brominated flame retardant compound which is DBDPE, TBBPA carbonate oligomer, 2,4,6-tribromophenyl terminated TBBPA, Br-acrylate, Br-epoxy, and Br-PS, or combinations thereof;
(c) 1.5 to 2 percent by weight of $Sb_2O_3$;
(d) 25 to 35 percent by weight of glass fiber; and
(e) 0.01 to 5 percent by weight of a filler comprising a combination of talc and calcium oxide; and
(f) 0.01 to 2 percent by weight of an antidrip agent;
and wherein the weight percents are based on the total weight of the composition.

In another particular embodiment, the composition comprises PBT which is a mixture containing 6 percent PBT with an intrinsic viscosity of 1.2 cm³/g as measured in a 60:40 phenol/tetrachloroethane mixture (available from SABIC Innovative Plastics as PBT 315); and 49 to 52 percent by weight of PBT with an intrinsic viscosity of 0.66 cm³/g as measured in a 60:40 phenol/tetrachloroethane mixture (available from SABIC Innovative Plastics as PBT 195).

In another embodiment, the composition comprises:
(a) 49 to 52 percent by weight of PBT with an intrinsic viscosity of 0.66 cm³/g as measured in a 60:40 phenol/tetrachloroethane mixture and 6 percent by weight of PBT with an intrinsic viscosity of 1.2 cm3/g as measured in a 60:40 phenol/tetrachloroethane mixture;
(b) 9 to 11 percent by weight of a brominated flame retardant compound which is TBBPA carbonate oligomer;
(c) 1.5 to 2 percent by weight of $Sb_2O_3$;
(d) 25 to 35 percent by weight of glass fiber; and
(e) 1.5 to 2.5 percent by weight of a filler comprising calcium oxide; and
(f) 0.01 to 2 percent by weight of an antidrip agent;
and wherein the weight percents are based on the total weight of the composition.

In another embodiment, the composition comprises:
(a) 49 to 52 percent by weight of PBT with an intrinsic viscosity of 0.66 cm³/g as measured in a 60:40 phenol/tetrachloroethane mixture and 6 percent by weight of PBT with an intrinsic viscosity of 1.2 cm3/g as measured in a 60:40 phenol/tetrachloroethane mixture;
(b) 9 to 11 percent by weight of a brominated flame retardant compound which is TBBPA carbonate oligomer;
(c) 1.5 to 2 percent by weight of $Sb_2O_3$;
(d) 25 to 35 percent by weight of glass fiber;
(e1) 0.05 to 0.15 percent of calcium oxide;
(e2) 1 to 2 percent by weight of talc; and
(f) 0.01 to 2 percent by weight of an antidrip agent;
and wherein the weight percents are based on the total weight of the composition.

In another embodiment, the composition comprises:
(a) 49 to 52 percent by weight of PBT with an intrinsic viscosity of 0.66 cm³/g as measured in a 60:40 phenol/tetrachloroethane mixture and 6 percent by weight of PBT with an intrinsic viscosity of 1.2 cm3/g as measured in a 60:40 phenol/tetrachloroethane mixture;
(b) 9 to 11 percent by weight of a brominated flame retardant compound;
(c) 1.5 to 2 percent by weight of $Sb_2O_3$;
(d) 28 to 32 percent by weight of glass fiber;
(e1) 0.05 to 0.15 percent by weight of calcium oxide; and
(e2) 1 to 2 percent by weight of talc; and
(f) 0.01 to 2 percent by weight of an antidrip agent;
and wherein the weight percents are based on the total weight of the composition.

In another embodiment, the composition contains about 1.5 to about 1.7 weight percent $Sb_2O_3$, based on the total weight of the composition.

In another embodiment, the composition comprises:
(a) 49 to 52 percent by weight of PBT with an intrinsic viscosity of 0.66 cm³/g as measured in a 60:40 phenol/tetrachloroethane mixture and 6 percent by weight of PBT with an intrinsic viscosity of 1.2 cm3/g as measured in a 60:40 phenol/tetrachloroethane mixture;
(b) 9 to 11 percent by weight of a brominated flame retardant compound which is DBDPE, TBBPA carbonate oligomer, 2,4,6-tribromophenyl terminated TBBPA, Br-acrylate, Br-epoxy, and Br-PS, or combinations thereof;
(c) 1.5 to 1.7 percent by weight of $Sb_2O_3$;
(d) 28 to 32 percent by weight of glass fiber;
(e1) about 0.15 percent by weight of calcium oxide; and
(e2) about 2.85 percent by weight of talc; and
(f) 0.01 to 2 percent by weight of an antidrip agent; and wherein
  (i) the composition meets or exceeds the requirements of UL94-V2; and
  (ii) less $Sb_2O_3$ is present in the composition comprising (a), (b), (c), (d), (e1), (e2), and (f) and as compared to a composition not comprising component (a), (b), (c), (d), and (f);
  (iii) the comparative tracking index (CTI) of the composition comprising (a), (b), (c), (d), (e1), (e2), and (f) is the same as or greater than the CTI for a corresponding composition as compared to a composition comprising component (a), (b), (c), (d), and (f);
and wherein the weight percents are based on the total weight of the composition.

In another embodiment, the invention is directed to an article prepared from the any of the compositions disclosed herein.

The following examples illustrate the scope of the invention. The examples and preparations which follow are provided to enable those skilled in the art to more clearly understand and to practice the present invention. They should not be considered as limiting the scope of the invention, but merely as being illustrative and representative thereof.

EXAMPLES

The examples of the compositions of the present invention, annotated hereinafter as "EX." and their comparative examples, annotated hereinafter as "CE", employed the materials listed in Table 1. All weight percents employed in the examples are based on the weight percent of the entire composition except where stated otherwise.

TABLE 1

| Component | Trade Name and Supplier |
|---|---|
| Polyester I | Polybutylene Terephthalate (PBT) sold by SABIC Innovative Plastics as VALOX ® 315 with an intrinsic viscosity of 1.2 cm³/g as measured in a 60:40 phenol/tetrachloroethane. |
| Polyester II | Polybutylene Terephthalate (PBT), sold by SABIC Innovative Plastics as VALOX ® 195 with an intrinsic viscosity of 0.66 cm³/g as measured in a 60:40 phenol/tetrachloroethane. |
| Phenoxy-terminated Tetrabrombisphenol A carbonate oligomer (TBBPA) | BC-52, CAS Reg. No. 71342-77-3, obtained from ICL Industrial Products. |
| 2,4,6-Tribromophenyl-terminated | BC-58, CAS Reg. No. 71342773, obtained |

TABLE 1-continued

| Component | Trade Name and Supplier |
|---|---|
| Tetrabrombisphenol A carbonate oligomer | from ICL Industrial Products. |
| Decabromodiphenylethane (DBDPE) | CAS Reg. No. 84852-53-9, from Albemarle Corporation. |
| Poly(pentabromobenzylacrylate) | Br-Acrylate, CAS Reg. No. 59447-57-3, obtained from ICL Industrial Products. |
| Tetrabromo bisphenol A-Tetrabromobisphenol A diglycidyl ether | Br-Epoxy, CAS Reg. No. 68928-70-1, from Sakamoto Yakuhin Kogyo. |
| Brominated Polystyrene | Br-PS, CAS Reg. No. 88497-56-7, from Albemarle Corporation. |
| Brominated polycarbonate (Br-PC) | Br-PC, a copolymer comprising units of bisphenol A and tetrabromobisphenol A, 24-29 percent bromine by weight (CAS Reg. No. 111211-39-3 and 156042-31-8, having an average molecular weight of 60,000. |
| Polytetrafluoroethylene | PTFE, CAS Reg. No. 9002-84-0, obtained from SABIC Innovative Plastics. |
| Stabilizer | Pentaerythritol tetrakis(3,5-di-tert-butyl-4-hydroxyhydrocinnamate), CAS Reg. No. 6683-19-8, from BASF. |
| Mold Release Agent | Low density polyethylene (LDPE), CAS Reg. No. 9002-88-4, from SABIC Innovative Plastics. |
| Glass Fiber | CAS Reg. No. 65997-17-3, from Chongqing Polycomp International Corp. as ECS303A. |
| Antimony Oxide | $Sb_2O_3$ CAS Reg. No. 1309-64-4; obtained from Campine N.V. (Belgium) as Antiox PBT 262415 |
| Talc | JETFINE ® 3CA obtained from LUZENAC EUROPE SAS. |
| Calcium Oxide | Analytical Grade CaO, CAS Reg. No. 60873-85-0; obtained from Sinopharm Chemical Reagent Co., Ltd. |

Testing

The tests used to characterize the compositions of the present invention, and the comparative examples, are summarized below in Table 2.

TABLE 2

| | Standards | Testing Conditions |
|---|---|---|
| Melt Volume Rate (MVR) | ASTM D 1238 | 250° C., 5 Kg |
| Uniaxial Tensile test | ASTM D 638 | 5 mm/min |
| Notched Izod Impact (NII) | ASTM D 256 | 5 lbf, 23° C., 3.2 mm |
| Vicat softening temperature (VIC) | ASTM D 1525 | 50N, 120° C./h |

Flammability testing was conducted according to UL 94 regulations. The total flame-out-time was calculated at a specified thickness. Table 3 shows the criteria for V0, V1, and V2 under UL94 standards. For a sample that meets V-2, burning stops within 30 seconds on a vertical specimen; drips of flaming particles are allowed. For a sample that meets V1, burning stops within 30 seconds on a vertical specimen; drips of particles allowed as long as they are not inflamed. For samples that meet V-0, burning stops within 10 seconds on a vertical specimen; drips of particles allowed as long as they are not inflamed.

TABLE 3

Material FR VX classifications under UL94 protocol.

| Criteria conditions | V-0 | V-1 | V-2 |
|---|---|---|---|
| Afterflame time for each individual specimen t1 or t2 | ≤10 s | ≤30 s | ≤30 s |
| Total afterflame time for any condition set (t1 plus t2 for the 5 specimen) | ≤50 s | ≤250 s | ≤250 s |
| Afterflame plus afterglow time for each individual specimen after the second flame application (t2 + t3) | ≤30 s | ≤60 s | ≤60 s |
| Afterflame or afterglow of any specimen up to the holding clamp | No | No | No |
| Cotton indicator ignited by flaming particles or drops | No | No | No |

Compounding and Molding

Typical compounding and molding procedures are described as follows.

All the ingredients except glass fiber were pre-blended, and then extruded using a twin extruder. A typical extruding condition is listed in Table 4.

TABLE 4

Compounding condition of FR polycarbonate resin.

| Parameters | | |
|---|---|---|
| Die | mm | 4 |
| Zone 1 Temp | ° C. | 100 |
| Zone 2 Temp | ° C. | 200 |
| Zone 3 Temp | ° C. | 240 |
| Zone 4 Temp | ° C. | 240 |
| Zone 5 Temp | ° C. | 240 |
| Zone 6 Temp | ° C. | 240 |
| Zone 7 Temp | ° C. | 250 |
| Zone 8 Temp | ° C. | 250 |
| Zone 9 Temp | ° C. | 260 |
| Die Temp | ° C. | 265 |
| Screw speed | rpm | 200 |
| Throughput | kg/hr | 60 |

The extruded pellets were molded in different shapes for mechanical tests. Table 5 shows a typical molding condition.

TABLE 5

Molding condition of FR PBT resin.

| Parameters | | |
|---|---|---|
| Cnd: Pre-drying time | Hour | 4 |
| Cnd: Pre-drying temp | ° C. | 120 |
| Hopper temp | ° C. | 50 |
| Zone 1 temp | ° C. | 250 |
| Zone 2 temp | ° C. | 250 |
| Zone 3 temp | ° C. | 250 |

TABLE 5-continued

Molding condition of FR PBT resin.

| Parameters | | |
|---|---|---|
| Nozzle temp | ° C. | 250 |
| Mold temp | ° C. | 50 |
| Screw speed | rpm | 100 |
| Back pressure | kgf/cm² | 50 |
| Molding Machine | NONE | Faunc |
| Mold Type (insert) | NONE | ASTM |

Results

A range of PBT compositions was evaluated. In Table 6, phenoxy-terminated tetrabromobisphenol-A carbonate oligomer (BC-52) was used as the brominated flame retardant compound and the amount of antimony oxide, calcium oxide and talc were varied. In Comparative Example 1 (CEX1, "Control"), no calcium oxide or talc was present in the composition. In CEX2, no calcium oxide was present in the composition.

In EX3-6, varying amounts of calcium oxide and talc were present, and the amount of antimony oxide was reduced from 3.3 weight percent to 1.32 weight percent (60 percent less $Sb_2O_3$). Mechanical properties were comparable in EX3-6 to CEX1 or CEX2. CTI either remained the same or improved as compared to CEX1. EX6, with a calcium oxide/talc blend of 0.1/1.55 weight percent had the best FR performance, did not drip, and robustly achieved V0@0.8 mm.

In EX7-11, calcium oxide was present in the compositions in varying amounts, but no talc was present. The amount of antimony oxide was reduced from 3.3 weight percent to 1.32 weight percent (60 percent less $Sb_2O_3$) in EX7-11. Mechanical properties were comparable in EX7-11 to CEX1 or CEX2. CTI either remained the same or improved as compared to CEX1. CTI was not lower in EX7-11 as compared to CEX1. EX7, with a calcium oxide content of 2 weight percent had the best flame retardant performance, did not drip, and robustly achieved V0@0.8 mm.

Thus, the amount of $Sb_2O_3$ can be reduced in the formulations without compromising flame retardance or CTI performance as provided by the method.

TABLE 6

Different substitution percentages in BC-52 system.

| Ingredient (weight percent) | CEX1 "Control" | CEX2 | EX3 | EX4 | EX5 | EX6 | EX7 | EX8 | EX9 | EX10 | EX11 |
|---|---|---|---|---|---|---|---|---|---|---|---|
| Polyester I | 6.0 | 6.0 | 6.0 | 6.0 | 6.0 | 6.0 | 6.0 | 6.0 | 6.0 | 6.0 | 6.0 |
| Polyester II | 49.94 | 49.94 | 49.41 | 49.94 | 49.25 | 49.94 | 51.39 | 51.36 | 51.31 | 50.91 | 46.59 |
| BC-52 | 10.5 | 10.5 | 10.5 | 10.5 | 10.5 | 10.5 | 10.5 | 10.5 | 10.5 | 10.5 | 10.5 |
| Stabilizer | 0.06 | 0.06 | 0.06 | 0.06 | 0.06 | 0.06 | 0.06 | 0.06 | 0.06 | 0.06 | 0.06 |
| Mold release agent | 0.2 | 0.2 | 0.2 | 0.2 | 0.2 | 0.2 | 0.2 | 0.2 | 0.2 | 0.2 | 0.2 |
| Glass fiber | 30 | 30 | 30 | 30 | 30 | 30 | 30 | 30 | 30 | 30 | 30 |
| $Sb_2O_3$ | 3.3 | 1.65 | 1.16 | 1.32 | 1.32 | 1.65 | 1.65 | 1.65 | 1.65 | 1.65 | 1.65 |
| Talc | 0 | 1.65 | 2.52 | 1.88 | 2.52 | 1.55 | 0 | 0 | 0 | 0 | 0 |
| CaO | 0 | 0 | 0.15 | 0.1 | 0.15 | 0.1 | 0.02 | 0.05 | 0.1 | 0.5 | 2 |
| MVR-ASTM (cm³/10 min) | 37 | 32 | 27 | 32 | 29 | 35 | 34 | 39 | 41 | 38 | 40 |
| Tens-M (GPa) | 10.6 | 10.9 | 10.8 | 10.7 | 10.8 | 10.8 | 10.5 | 10.4 | 10.5 | 10.5 | 10.8 |
| Tens-S (MPa) | 130 | 128 | 123 | 123 | 124 | 125 | 131 | 130 | 129 | 129 | 125 |
| Tens-E (%) | 2.3 | 2.1 | 2.2 | 2.3 | 2.2 | 2.1 | 2.4 | 2.3 | 2.3 | 2.3 | 2.1 |
| VIC (120° C./h, 50 N) | 203 | 202 | 201 | 201 | 202 | 200 | 203 | 201 | 201 | 201 | 201 |
| Izod-N (J/m) | 77 | 75 | 66 | 67 | 69 | 68 | 80 | 76 | 76 | 74 | 69 |
| CTI (V) | 175 | 175 | 225 | 225 | 225 | 225 | 175 | 175 | 225 | 225 | 250 |
| FR 0.75 mm (UL94) | V0/V2 | V2 | V2 | V2 | V0 | V0 | V0/V2 | V0/V2 | V0/V2 | V0/V2 | V0 |

As indicated previously, these results are surprising and unexpected in light of the recent paper "Studies on the Preparation and Properties of Flame-retardant Reinforced PBT with High Comparative Tracking Index" (http://www.engpapers.com/107180.html, last vested Sep. 13, 2012). In short, as summarized in Table 6, the inventors found that by adding calcium oxide or calcium oxide/talc to the formulations, it was possible to reduce the amount of antimony oxide that was used. In the case of the paper, the presence of calcium oxide reduced performance with respect to flame retardance in formulations containing PBT, glass fiber, antimony oxide, and the chlorinated flame retardant Dechlorane Plus (DRCP; 1,2,3,4,7,8,9,10,13,13,14,14-dodecachloro-1,4,4a,5,6,6a,7,10,10a,11,12,12a-dodecahydro-1,4,7,10-dimethanodibenzo[a,e]cyclooctene; CAS 13560-89-9) as compared to formulations that did not contain calcium oxide.

Moreover, the inventors also found that calcium oxide or calcium oxide/talc addition improved CTI and also improved or maintained flame retardance, while the paper reported improved CTI but reduced flame retardant performance.

Adding calcium oxide and talc (which are both alkaline in nature) to the compositions effectively neutralizes the acidity of the bromine/antimony mixture present in the compositions, improving the hydrostability of the resulting polyesters, as reflected in the results of the humidity aging tests that were performed on CEX1 and EX6. The test was conducted under 95° C. and 90% humidity for 3 weeks. The results provided in Table 7 indicate that EX6 had improved tensile strength and tensile elongation values compared to CEX1, while tensile modulus and N-Izod values were approximately the same. This could also be a reason why CEX6 and EX11 pass the flame retardance test. The acid generated from Br/Sb during the flame retardance test is suspected to degrade the PBT in the flame, which could readily lead to dripping. Thus, partial neutralization with calcium oxide/talc helps to prevent dripping.

TABLE 7

|  | T-M/MPa | | T-S/Mpa | | T-E/% | | N-Izod/J · m$^{-1}$ | |
| --- | --- | --- | --- | --- | --- | --- | --- | --- |
|  | CEX1 | EX6 | CEX1 | EX6 | CEX1 | EX6 | CEX1 | EX6 |
| Origin | 11000 | 11500 | 123 | 121 | 2.3 | 2.1 | 72 | 70 |
| Aging | 10450 | 10695 | 76 | 100 | 1.4 | 1.7 | 58 | 58 |

Compositions containing alternate brominated flame retardant compounds were also evaluated. The brominated flame retardant compounds that were tested included 2,4,6-Tribromophenyl-terminated tetrabromobisphenol-A carbonate oligomer (BC-58), Decabromodiphenylethane (DBDPE), Poly(pentabromobenzylacrylate) (Br-acrylate), Tetrabromo bisphenol A-Tetrabromobisphenol A diglycidyl ether (Br-epoxy) and brominated polystyrene (Br-PS).

The same formulation was used as in Table 6 with respect to each ingredient (See EX 3), except BC-52 was replaced by one of the other brominated compounds, keeping the total content of bromine as a weight percent constant. In addition, the substitute percentage of Sb$_2$O$_3$ by calcium oxide/talc was fixed at 50%. The results, summarized in Table 8, were similar to those for the BC-52 system depicted in Table 6. CTI and flame retardance were comparable or better when calcium oxide/talc is added to the compositions and the amount of antimony oxide is reduced. Other performance measures remained approximately the same.

TABLE 9

Substitution trial in system not containing glass.

|  | CEX12 | EX13 |
| --- | --- | --- |
| Polyester I | 67.64 | 67.64 |
| Br-PC | 26 | 26 |
| PTFE | 0.1 | 0.1 |
| Stabilizer | 0.06 | 0.06 |
| Mold release agent | 0.2 | 0.2 |
| Sb$_2$O$_3$ | 6 | 3 |

TABLE 9-continued

Substitution trial in system not containing glass.

|  | CEX12 | EX13 |
| --- | --- | --- |
| Talc | 0 | 2.85 |
| CaO | 0 | 0.15 |
| MVR-ASTM (cm$^3$/10 min) | 17 | 16 |
| Tens-M (GPa) | 2.6 | 2.7 |
| Tens-S (MPa) | 41 | 51 |
| Tens-E (%) | 11 | 10 |
| HDT (1.82 MPa, 3.2 mm) | 67 | 69 |
| Izod-N (J/m) | 46 | 47 |
| CTI (V) | 175 | 200 |
| FR 0.8 mm (UL) | V0 | V0 |

The foregoing invention has been described in some detail by way of illustration and example for purposes of clarity and understanding. The invention has been described with

TABLE 8

| | Br-Type | | | | | | | | | | | |
| --- | --- | --- | --- | --- | --- | --- | --- | --- | --- | --- | --- | --- |
| Component (Weight Percent) | BC-52 (CEX1 and EX6) | | BC-58 | | DBDPE | | Br-acrylate | | Br-epoxy | | Br-PS | |
| Sb$_2$O$_3$ % | 3.3 | 1.65 | 3.3 | 1.65 | 3.3 | 1.65 | 3.3 | 1.65 | 3.3 | 1.65 | 3.3 | 1.65 |
| Talc | 0 | 1.55 | 0 | 1.55 | 0 | 1.55 | 0 | 1.55 | 0 | 1.55 | 0 | 1.55 |
| CaO | 0 | 0.1 | 0 | 0.1 | 0 | 0.1 | 0 | 0.1 | 0 | 0.1 | 0 | 0.1 |
| MVR (cm$^3$/10 min) | 37 | 35 | 18 | 15 | 18 | 18 | 17 | 15 | 18 | 15 | 15 | 11 |
| Tens-M (GPa) | 10.6 | 10.8 | 10.7 | 10.9 | 10.6 | 11.0 | 10.7 | 10.9 | 10.9 | 11.0 | 10.6 | 10.8 |
| Tens-S (MPa) | 130 | 125 | 130 | 126 | 126 | 123 | 125 | 123 | 134 | 130 | 121 | 116 |
| Tens-E (%) | 2.3 | 2.1 | 2.4 | 2.3 | 2.5 | 2.5 | 2.5 | 2.4 | 2.4 | 2.4 | 2.4 | 2.4 |
| VIC (120° C./h, 50 N) | 203 | 200 | 208 | 208 | 211 | 210 | 210 | 209 | 207 | 207 | 211 | 209 |
| N-Izod (J/m) | 77 | 68 | 74 | 67 | 82 | 77 | 85 | 77 | 75 | 70 | 79 | 74 |
| CTI (V) | 175 | 225 | 200 | 225 | 175 | 200 | 200 | 250 | 250 | 250 | 300 | 300 |
| FR 0.8 mm (UL94) | V0/V2 | V0 | V0 | V0 | V0 | V0 | V0 | V0 | V0 | V0 | V0 | V0 |

Table 9 summarizes the results when glass fiber is not present in the compositions. In contrast to Table 6 formulations, an antidrip agent is present in the formulations of Table 9. In CEX12, no calcium oxide or talc was present in the composition. As in earlier examples, in EX13, when talc/calcium oxide was added to the composition and the amount of Sb$_2$O$_3$ was reduced, CTI improved. EX13 also was found to meet UL-94 V0.

reference to various specific embodiments and techniques. It should be understood that many variations and modifications may be made while remaining within the spirit and scope of the invention. It will be obvious to one of skill in the art that changes and modifications may be practiced within the scope of the appended claims. The above description is intended to be illustrative and not restrictive. The scope of the invention should, therefore, be determined not with reference to the above description, but should instead be determined with reference to the following appended claims, along with the full scope of equivalents to which such claims are entitled.

The invention claimed is:

1. A method of reducing the amount of antimony flame retardant compound in a flame retardant composition which comprises using a combination of talc and calcium oxide as a filler in the composition, wherein the composition comprises:
    (a) 30 to 80 percent by weight of a polyester;
    (b) 3 to 30 percent by weight of a brominated flame retardant compound selected from the group consisting of phenoxy-terminated tetrabromobisphenol A carbonate oligomer; 2,4,6-tribromophenyl-terminated tetrabromobisphenol A carbonate oligomer; brominated polycarbonate which is a copolymer comprising units of bisphenol A and tetrabromobisphenol A, 24-29 percent bromine by weight; and combinations thereof;
    (c) 0.1 to 5 percent by weight of an antimony flame retardant compound; and
    (d) 0.01 to 5 percent by weight of a filler comprising a combination of talc and calcium oxide; and
    wherein
        (i) the composition meets or exceeds the requirements of UL94-V2;
        (ii) less antimony retardant compound is present in the composition as compared to a corresponding composition comprising (a), (b), (c) and no (d); and
        (iii) the comparative tracking index (CTI) of the composition is the same as or greater than the CTI for a corresponding composition comprising (a), (b), (c) and no (d); and
    wherein the percent by weight values are based on the total weight of the composition.

2. The method of claim 1, wherein the polyester poly (ethylene terephthalate), poly(1,4-butylene terephthalate), or a combination thereof.

3. The method of claim 1, wherein the antimony flame retardant compound is antimony oxide.

4. The method of reducing the amount of antimony flame retardant compound in a flame retardant composition according to claim 1, which comprises using a combination of talc and calcium oxide as a filler in the composition, wherein the composition comprises:
    (a) 65 to 70 percent by weight of the polyester;
    (b) 20 to 30 percent by weight of the brominated flame retardant compound;
    (c) 2 to 4 percent by weight of the antimony flame retardant compound; and
    (d) 2.5 to 3.5 percent by weight of the filler.

5. The method according to claim 1, wherein the composition comprises:
    (a) 55 to 57 percent by weight of poly(1,4-butylene terephthalate);
    (b) 9 to 11 percent by weight of phenoxy-terminated tetrabrombisphenol A carbonate oligomer;
    (c) 1.5 to 1.7 percent by weight of $Sb_2O_3$;
    (d) 28 to 32 percent by weight of glass fiber;
    (e1) 0.05 to 0.15 percent by weight of calcium oxide; and
    (e2) 1.25 to 1.75 percent by weight of talc; and
    wherein
        (ii) less $Sb_2O_3$ is present in the composition as compared to a corresponding composition comprising (a), (b), (c), (d) and no (e1) or (e2); and
        (iii) the comparative tracking index (CTI) of the composition is the same as or greater than the CTI for a corresponding composition comprising (a), (b), (c), (d), and no (e1) or (e2).

6. A flame retardant composition comprising:
    (a) 30 to 80 percent by weight of a polyester;
    (b) 3 to 30 percent by weight of a brominated flame retardant compound selected from the group consisting of phenoxy-terminated tetrabromobisphenol A carbonate oligomer; 2,4,6-tribromophenyl-terminated tetrabromobisphenol A carbonate oligomer; brominated polycarbonate which is a copolymer comprising units of bisphenol A and tetrabromobisphenol A, 24-29 percent bromine by weight; and combinations thereof;
    (c) 0.1 to 5 percent by weight of an antimony flame retardant compound; and
    (d) 0.01 to 5 percent by weight of a filler comprising a combination of talc and calcium oxide; and
    wherein
        (i) the composition meets or exceeds the requirements of UL94-V2;
        (ii) less antimony retardant compound is present in the composition as compared to a corresponding composition comprising (a), (b), (c) and no (d); and
        (iii) the comparative tracking index (CTI) of the composition is the same as or greater than the CTI for a corresponding composition comprising (a), (b), (c) and no (d); and
    wherein the percent by weight values are based on the total weight of the composition.

7. The flame retardant composition of claim 6, wherein the polyester is poly(ethylene terephthalate), poly(1,4-butylene terephthalate), or a combination thereof.

8. The flame retardant composition according to claim 7, which comprises using calcium oxide or a combination of talc and calcium oxide as a filler in the composition, wherein the composition comprises:
    (a) 65 to 70 percent by weight of a polyester;
    (b) 20 to 30 percent by weight of the brominated flame retardant compound;
    (c) 2 to 4 percent by weight of the antimony flame retardant compound; and
    (d) 2.5 to 3.5 percent by weight of the filler.

9. The flame retardant composition of claim 6, wherein the antimony flame retardant compound is antimony oxide.

10. An article prepared from the composition of claim 6.

* * * * *